(12) United States Patent
Kang et al.

(10) Patent No.: US 12,539,689 B2
(45) Date of Patent: Feb. 3, 2026

(54) WINDOW, METHOD FOR MANUFACTURING THE SAME, AND DISPLAY DEVICE INCLUDING THE SAME

(71) Applicant: SAMSUNG DISPLAY CO., LTD., Yongin-si (KR)

(72) Inventors: Minhyuck Kang, Seoul (KR); Yukihiro Miyazawa, Asan-si (KR); Su-Hyoung Kang, Seoul (KR); Jeongeun Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 15 days.

(21) Appl. No.: 18/412,422

(22) Filed: Jan. 12, 2024

(65) Prior Publication Data

US 2024/0149560 A1 May 9, 2024

Related U.S. Application Data

(62) Division of application No. 17/444,494, filed on Aug. 5, 2021, now Pat. No. 11,872,786.

(30) Foreign Application Priority Data

Dec. 24, 2020 (KR) .................. 10-2020-0183615

(51) Int. Cl.
*B32B 17/10* (2006.01)
*B32B 7/12* (2006.01)
(Continued)

(52) U.S. Cl.
CPC .......... *B32B 17/10027* (2013.01); *B32B 7/12* (2013.01); *B32B 17/10165* (2013.01);
(Continued)

(58) Field of Classification Search
None
See application file for complete search history.

(56) References Cited

U.S. PATENT DOCUMENTS 6,447,897 B1 9/2002 Liang et al.
8,722,185 B2 5/2014 Niwa et al.
(Continued)

FOREIGN PATENT DOCUMENTS

CN 103184015 A 7/2013
CN 106183275 A 12/2016
(Continued)

OTHER PUBLICATIONS

Zhou, Yin-Ning et al., "PhotoATRP-Based Fluorinated Thermosensitive Block Copolymer for Controllable Water/Oil Separation", Industrial & Engineering Chemistry Research, p. 10714-10722.
(Continued)

*Primary Examiner* — David Sample
(74) *Attorney, Agent, or Firm* — Womble Bond Dickinson (US) LLP

(57) ABSTRACT

A window is provided to include a glass substrate, an adhesive layer on the glass substrate, a polymer layer between the glass substrate and the adhesive layer, the polymer layer having a surface adjacent to the adhesive layer, the surface being hydrophilic at a first temperature and being hydrophobic at a second temperature higher than the first temperature, and a protective layer on the adhesive layer. Thereby, when the protective layer is damaged, only the protective layer may be replaced without replacing a glass substrate.

6 Claims, 12 Drawing Sheets

(51) Int. Cl.
  *B32B 27/30* (2006.01)
  *B32B 27/34* (2006.01)
  *B32B 37/06* (2006.01)

(52) U.S. Cl.
  CPC ...... *B32B 17/10963* (2013.01); *B32B 27/308* (2013.01); *B32B 27/34* (2013.01); *B32B 37/06* (2013.01); *B32B 2270/00* (2013.01); *B32B 2307/73* (2013.01); *B32B 2457/20* (2013.01)

(56) References Cited

U.S. PATENT DOCUMENTS

| | | | |
|---|---|---|---|
| 9,926,463 | B2 | 3/2018 | Kusuura et al. |
| 10,471,681 | B2 | 11/2019 | Tapio et al. |
| 11,340,524 | B2 | 5/2022 | Liu et al. |
| 2009/0226648 | A1 | 9/2009 | Wild et al. |
| 2015/0099110 | A1 | 4/2015 | Bellman et al. |
| 2016/0159052 | A1 | 6/2016 | Kim et al. |
| 2019/0308227 | A1 | 10/2019 | Jo et al. |
| 2020/0262746 | A1 | 8/2020 | He et al. |
| 2021/0273206 | A1* | 9/2021 | Hu .................... H10K 59/1201 |

FOREIGN PATENT DOCUMENTS

| | | |
|---|---|---|
| CN | 206370254 U | 8/2017 |
| CN | 110549702 A | 12/2019 |
| CN | 111796479 A | 10/2020 |
| JP | 2014240875 A | 12/2014 |
| JP | 2015187237 A | 10/2015 |
| JP | 2016075729 A | 5/2016 |
| JP | 2019039082 A | 3/2019 |
| KR | 20130075676 A | 7/2013 |
| KR | 20150038203 A | 4/2015 |
| KR | 10-1776110 B1 | 9/2017 |
| KR | 10-2037061 B1 | 10/2019 |
| KR | 10-2019-0130490 A | 11/2019 |
| KR | 10-2046973 B1 | 12/2019 |
| KR | 10-2146151 B1 | 8/2020 |

OTHER PUBLICATIONS

Office Action issued in counterpart Chinese Patent Application No. 202111581324.5 on Nov. 24, 2025.

* cited by examiner

WINDOW, METHOD FOR MANUFACTURING THE SAME, AND DISPLAY DEVICE INCLUDING THE SAME

CROSS-REFERENCE TO RELATED APPLICATIONS

This application is a divisional of U.S. patent application Ser. No. 17/444,494, filed Aug. 5, 2021, which claims priority to and the benefit of Korean Patent Application No. 10-2020-0183615, filed Dec. 24, 2020, the entire content of both of which is incorporated herein by reference.

BACKGROUND

1. Field

The present disclosure relates to a window, a method for manufacturing the window, and a display device including the window, and more specifically, to a replaceable window, a method for manufacturing the replaceable window, and the display device including the replaceable window.

2. Description of Related Art

A display device displays various and suitable images on a display screen to provide information to a user. Generally, the display device displays information within a given screen. Recently, flexible display devices including a foldable and/or bendable display panel have been developed. A flexible display device may be foldable, rollable, and/or bendable unlike a rigid display device. A flexible display device, of which the shape may be variously and suitably changed, may be carried regardless of a screen size, thereby improving user's convenience.

Meanwhile, research is being conducted on a glass substrate having improved durability to be used for a flexible display device, and on a method for manufacturing the same, etc.

SUMMARY

Aspects of embodiments of the present disclosure are directed towards a protective layer-replaceable window, and a method for manufacturing the same.

Aspects of embodiments of the present disclosure are also directed towards a display device including a protective layer-replaceable window.

An embodiment of the present disclosure provides a window including a glass substrate, an adhesive layer on the glass substrate, a polymer layer between the glass substrate and the adhesive layer, the polymer layer having a surface adjacent to the adhesive layer, the surface being hydrophilic at a first temperature and being hydrophobic at a second temperature higher than the first temperature; and a protective layer on the adhesive layer.

In an embodiment, an adhesive strength of the adhesive layer to the polymer layer at the first temperature may be higher than an adhesive strength of the adhesive layer to the polymer layer at the second temperature.

In an embodiment, the polymer may include (e.g., be) a polymer, and wherein the polymer includes a main chain, a first side chain substituted at the main chain, and a second side chain substituted at the main chain, and the first side chain may include (e.g., be) an acrylic acid group, and the second side chain may include (e.g., be) an amide group.

In an embodiment, the display device may further include an adhesive auxiliary layer between the polymer layer and the glass substrate, wherein the first side chain of the polymer may be adjacent to the adhesive auxiliary layer.

In an embodiment, the polymer may be divided into a first moiety including a first repeating unit including the first side chain, and a second moiety including a second repeating unit including the second side chain.

In an embodiment, the polymer may include a first repeating unit including the first side chain, and a second repeating unit including the second side chain, the first repeating unit and the second repeating unit being alternatively coupled (e.g., connected).

In an embodiment, the first temperature may be about 10° C. to about 35° C., and the second temperature may be about 50° C. to about 120° C.

In an embodiment, a thickness of the polymer layer may be about 0.01 μm to about 100 μm.

In an embodiment, a contact angle of water to the polymer layer at the first temperature may be about 65 degrees or less, and a contact angle of water to the polymer layer at the second temperature may be about 95 degrees to about 100 degrees.

In an embodiment, the polymer layer may include (e.g., be) a poly(N-isopropylacrylamide)-block-poly(acrylic acid) or a poly(N-isopropylacrylamide-co-acrylic acid).

An embodiment of the present disclosure provides a display device including a display module, and a window on the display module, wherein the window includes a glass substrate, a polymer layer on the glass substrate, the polymer layer including a polymer including a main chain, a plurality of acrylic acid groups substituted at the main chain, and a plurality of amide groups substituted at the main chain, an adhesive layer on the polymer layer; and a protective layer on the adhesive layer, wherein a proportion of hydrogen bonds between the amide groups in the polymer at a second temperature is higher than a proportion of hydrogen bonds between the amide groups in the polymer at a first temperature, the second temperature being higher than the first temperature.

In an embodiment, a surface of the polymer layer adjacent to the adhesive layer may be hydrophilic at the first temperature, and the surface of the polymer layer may be hydrophobic at the second temperature.

In an embodiment, the amide groups each may include (e.g., be) a substituted or unsubstituted isopropyl group substituted at a nitrogen atom.

In an embodiment, the amide groups may be each substituted at a nitrogen atom, and may include (e.g., be) an alkyl group containing at least one fluorine atom.

In an embodiment, an adhesive strength of the adhesive layer to the polymer layer at the first temperature may be higher than an adhesive strength of the adhesive layer to the polymer layer at the second temperature.

In an embodiment, the window may include a folding area, a first non-folding area, and a second non-folding area, the first non-folding area and the second non-folding area being spaced apart from each other with the folding area therebetween.

An embodiment of the present disclosure provides a method for manufacturing a window, the method including: providing a window including a glass substrate, a polymer layer on the glass substrate, and a replaceable member on the polymer layer; heating the polymer layer to a first temperature; removing the replaceable member from the polymer layer which has been heated to the first temperature; cooling the polymer layer, from which the replaceable member has been removed, to a second temperature; and providing a protective member on the cooled polymer layer, wherein the polymer layer includes (e.g., is) a polymer including a main chain, a plurality of acrylic acid groups substituted at the main chain, and a plurality of amide groups substituted at the main chain.

In an embodiment, the first temperature may be about 50° C. to about 120° C., and the second temperature may be about 10° C. to about 35° C.

In an embodiment, a contact angle of water to a surface of the polymer layer adjacent to the replaceable member after the heating of the polymer layer to the first temperature may be about 65 degrees or less.

In an embodiment, a contact angle of water to the surface after the cooling of the polymer layer to the second temperature may be about 95 degrees to about 100 degrees.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain principles of the present disclosure. In the drawings.

DETAILED DESCRIPTION

Figure 1:
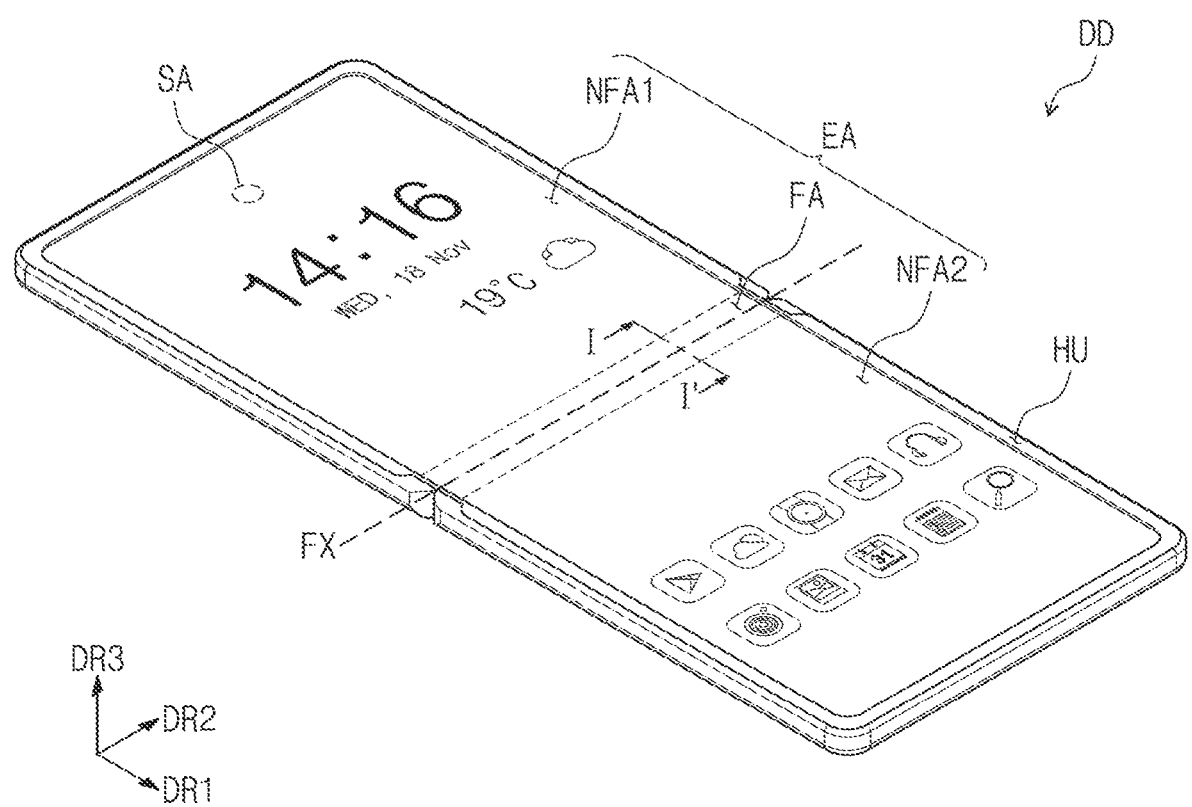
FIG. 1 is a perspective view illustrating a display device of an embodiment.

The present disclosure may be suitably modified in many alternate forms, and thus specific embodiments will be illustrated in the drawings and described in more detail in the text. It should be understood, however, that the present disclosure is not limited to the particular forms and embodiments disclosed, but rather, the present disclosure is intended to cover all suitable modifications, equivalents, and alternatives falling within the spirit and scope of the present disclosure.

As used herein, the use of the term "may," when describing embodiments of the present disclosure, refers to "one or more embodiments of the present disclosure." In the present description, when an element (or a region, a layer, a portion, etc.) is referred to as being "on," "connected to," or "coupled to" another element, it will be understood that the element may be directly on, directly connected to, or directly coupled to the other element, or that one or more third element(s) may be disposed therebetween.

The term "about" and similar terms, when used herein in connection with a numerical value or a numerical range, are inclusive of the stated value and mean within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations, or within ±30%, 20%, 10%, or 5% of the stated value.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Like reference numerals refer to like elements. Also, in the drawings, the thickness, the ratio, and the dimensions of elements may be exaggerated for an effective description of technical contents.

The term "and/or," includes any and all combinations of one or more of which associated configurations may define (e.g., any and all combinations of one or more of the associated listed items).

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present disclosure. The terms of a singular form may include plural forms unless the context clearly indicates otherwise.

Unless otherwise defined, all terms (including technical and scientific terms) used herein have the same meaning as would be commonly understood by one of ordinary skill in the art to which the present disclosure pertains. It is also to be understood that terms defined in commonly used dictionaries should be interpreted as having meanings consistent with the meanings in the context of the related art, and terms should not be interpreted in an idealized or overly formal sense unless expressly defined herein.

It should be understood that the terms "comprise", "include", "have", and similar terms are intended to specify the presence of stated features, integers, processes, operations, elements, components, or combinations thereof, but do not preclude the presence or addition of one or more other features, integers, processes, operations, elements, components, or combinations thereof.

Hereinafter, a window, a display device including the same, and a method for manufacturing the window of one or more embodiments will be explained with reference to the accompanying drawings.

Figure 2:
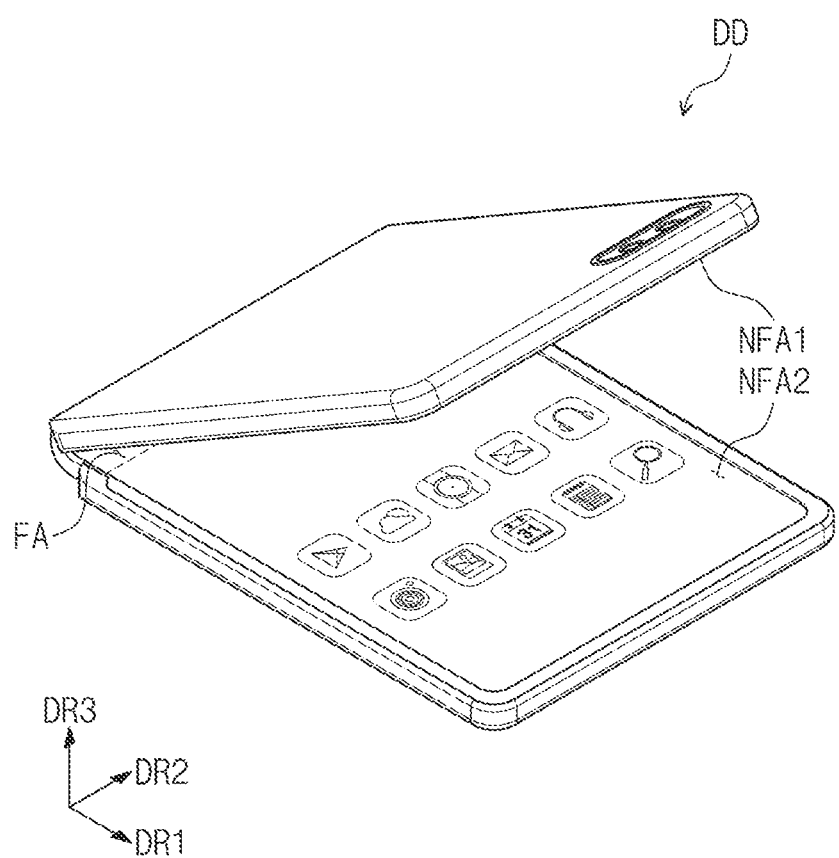
FIG. 2 is a perspective view illustrating a display device of an embodiment.

FIG. 1 is a perspective view illustrating a display device of an embodiment. FIG. 2 is a perspective view illustrating a display device of an embodiment. FIG. 1 illustrates a state in which a display device DD is unfolded, and FIG. 2 illustrates a state in which the display device DD is folded. The display device DD according to an embodiment may be a flexible display device that is foldable and/or bendable, or may be maintained in a folded state or bent state.

Referring to FIG. 1 and FIG. 2, the display device DD may be a device activated in response to an electrical signal. For example, the display device DD may be a personal digital assistant, a tablet, a car navigation unit, a game console, or a wearable device, but is not limited thereto. In FIG. 1 and FIG. 2, a portable electronic device is illustrated as the display device DD according to an embodiment.

The display device DD may display an image through an active area EA. The active area EA may include non-folding areas NFA1 and NFA2, and a folding area FA. The folding area FA may be bent (e.g., bendable) with reference to (e.g., may be bendable around) a folding axis FX, which is a virtually extending line of a second directional axis DR2. For example, the folding axis FX may be a virtual line that extends along the second directional axis DR2. In some embodiments, the folding area FA may be between the non-folding areas NFA1 and NFA2, and the non-folding areas NFA1 and NFA2 and the folding area FA may be arranged with each other along a first directional axis DR1.

When the display device DD is folded, the non-folding areas NFA1 and NFA2 may face each other. In a fully folded state (e.g., a fully inwardly folded state), the active area EA may not be exposed to the outside, and this may be referred to as in-folding. However, this is illustrated as an example, and the movement of the display device DD is not limited thereto.

In some embodiments, the display device DD may be able to perform only one operation selected from among in-folding operation and out-folding operation. An out-folding operation may refer to the capability of the display device DD to fully fold outwardly such that the non-folding areas NFA1 and NFA2 of the active area EA face oppositely from each other. In a fully outwardly folded state, the active area EA may be exposed (e.g., fully exposed) to the outside. In some embodiments, the display device DD may be able to perform both in-folding movement and out-folding movement. In this case, the same area of the display device DD such as the folding area FA may be in-folded and out-folded (e.g., may be able to in-fold and out-fold). In some embodiments, a portion of an area of the display device DD may be in-folded, and another portion of the area may be out-folded.

The display device DD of FIG. 1 and FIG. 2 is illustrated to include one folding area FA and two non-folding areas NFA1 and NFA2, but the number of the folding area(s) FA and the number of the non-folding area(s) are not limited thereto. For example, the display device may include at least three non-folding areas and at least two folding areas disposed between the non-folding areas adjacent to each other.

In FIG. 1 and FIG. 2, the folding axis FX is illustrated to be parallel to the short axis (e.g., the short side) of the display device DD, for example, a direction in which the second directional axis DR2 extends. However, this is illustrated as an example, and the present disclosure is not limited thereto. For example, the folding axis may be parallel to the long axis (e.g., the long side) of the display device DD, for example, a direction in which the first directional axis DR1 extends.

The display device DD may include a sensing area SA surrounded by (e.g., partially or entirely surrounded by) the active area EA. For example, the active area EA may be around the sensing area SA. For example, the sensing area SA may overlap with a camera module. Although one sensing area SA is illustrated in FIG. 1, the present disclosure is not limited thereto. The display device of an embodiment may include a plurality of sensing areas.

The display device DD may include a case HU. The case HU may accommodate a display module DM (FIG. 3) and a window WM (FIG. 3) which will be described in more detail later.

Meanwhile, although FIG. 1 and FIG. 2 illustrate that the display device DD of an embodiment is a foldable display device, the embodiment of the present disclosure is not limited thereto. The display device according to an embodiment may be a flexible display device that is foldable and/or bendable, or may be maintained in a folded state or bent state. In the present description, the term 'flexible' indicates a property of being bendable, and may not be limited to a structure being completely foldable, but may include a structure being bendable to a degree of a few nanometers.

The display device DD may have a three-dimensional shape having a set or predetermined thickness in a direction of a third directional axis DR3 normal (e.g., perpendicular) to a plane defined by the first directional axis DR1 and the second directional axis DR2 crossing the first directional axis DR1. In the present description, an upper surface (or a front surface) and a lower surface (or a rear surface) of each member (e.g., layer, element, etc.) are defined on the basis of a direction in which an image is displayed on the active area EA. The upper surface and the lower surface may be opposed to each other (e.g., may face oppositely from each other) in the third direction DR3, and the normal direction of each of the upper surface and the lower surface may be parallel to the third direction DR3. Meanwhile, directions indicated by the first to third directional axes DR1, DR2, and DR3 are relative concepts, and may thus be changed to other directions. Hereinafter, first to third directions are regarded as the directions indicated respectively by the first to third directional axes DR1, DR2, and DR3, and the same reference numerals should be referred to.

Figure 3:
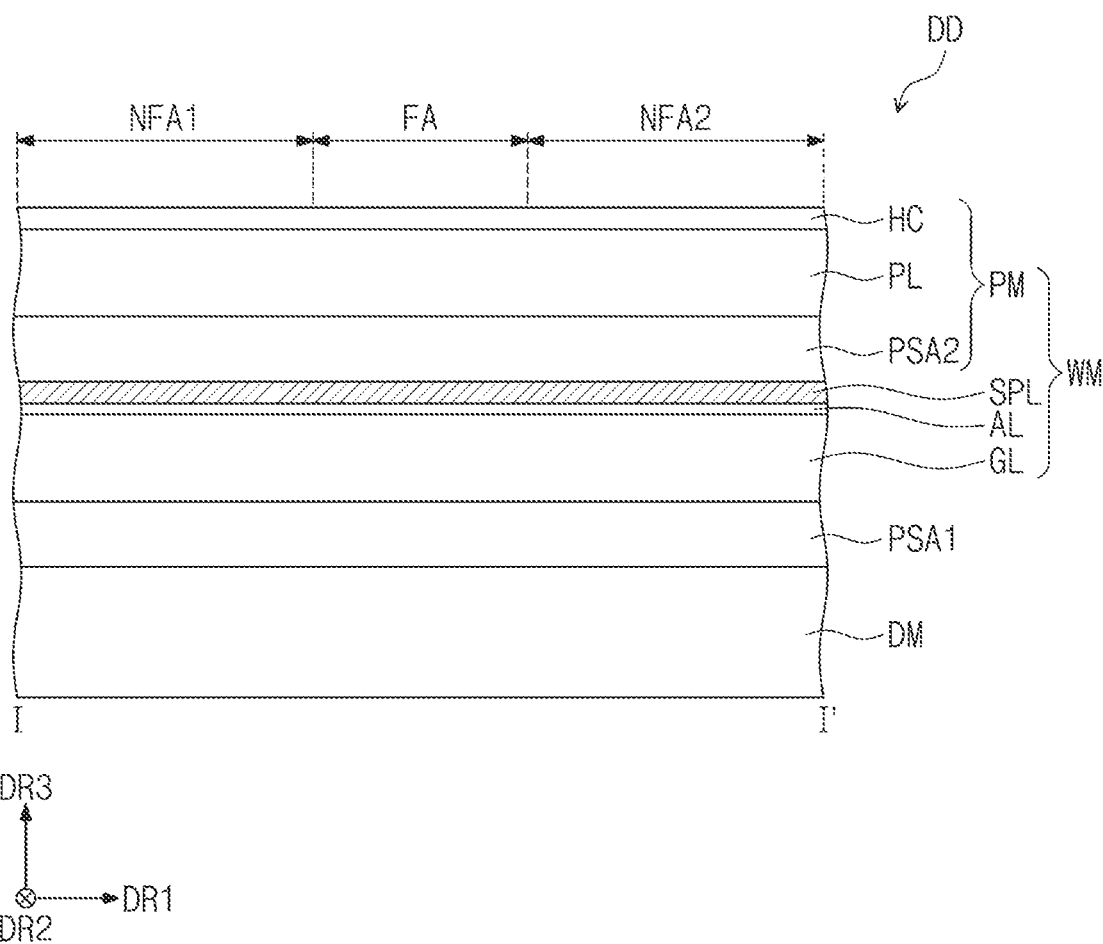
FIG. 3 is a cross-sectional view of a display device of an embodiment.

FIG. 3 is a cross-sectional view of a display device of an embodiment. FIG. 3 is a cross-sectional view taken along line I-I' shown in FIG. 1 of a display device according to an embodiment.

Referring to FIG. 3, the display device DD according to an embodiment includes a display module DM, and a window WM disposed on the display module DM. The display module DM may include a display panel, and a polarization layer. The display panel may generate light to display an image.

The window WM may be disposed on the display module DM. The window WM may protect the display module DM from an external impact. The window WM may have optically transparent properties.

In an embodiment, the display device DD may include a lower adhesive layer PSA1 between the window WM and the display module DM. However, this is illustrated only as an example, and the present disclosure is not limited thereto. The window WM may be directly disposed on the display module DM.

The lower adhesive layer PSA1 may be a pressure sensitive adhesive (PSA) film and/or an optically clear adhesive (OCA). Adhesive layers to be described below may be the same as the lower adhesive layer PSA1 and may include a typical adhesive (e.g., any suitable adhesive that is generally available).

In an embodiment, the window WM may include a glass substrate GL, a polymer layer SPL, an adhesive layer PSA2, and a protective layer PL. The glass substrate GL may be more adjacent to the display module DM than the polymer layer SPL. For example, the glass substrate GL may be between the display module DM and the polymer layer SPL. The glass substrate GL may be an ultra-thin glass (UTG).

The polymer layer SPL may be disposed on the glass substrate GL. The polymer layer SPL may be more adjacent to the glass substrate GL than the protective layer PL. For example, the polymer layer SPL may be between the glass substrate GL and the protective layer PL. In an embodiment an adhesive auxiliary layer AL may be further provided between the polymer layer SPL and the glass substrate GL. The adhesive auxiliary layer AL may function to improve the adhesive strength between the glass substrate GL and the polymer layer SPL. However, this is illustrated only as an example, and the present disclosure is not limited thereto. The polymer layer SPL may be directly disposed on the glass substrate GL.

The adhesive strength of the adhesive layer PSA2 to the polymer layer SPL (e.g., the adhesive strength between the adhesive layer PSA2 and the polymer layer SPL) may vary depending on the temperature (e.g., the temperature of the polymer layer SPL). For example, the amount of work required to separate the adhesive layer PSA2 from the polymer layer SPL may vary based on temperature. The polymer layer SPL may be separated from (e.g., separable from) the adhesive layer PSA2 at high temperature. For example, the adhesive strength of the adhesive layer PSA2 to the polymer layer SPL at a first temperature may be higher than the adhesive strength of the adhesive layer PSA2 to the polymer layer SPL at a second temperature higher than the first temperature. The first temperature may be about 10° C. to about 35° C., and the second temperature may be about 50° C. to about 120° C. In some embodiments, the adhesive strength of the adhesive layer PSA2 to the polymer layer SPL may decrease as temperature increases.

In the polymer layer SPL, a first surface F1 adjacent to (e.g., facing and/or in contact with) the adhesive layer PSA2 may be hydrophilic at the first temperature, and hydrophobic at the second temperature. At the first temperature, a contact angle of water to the first surface F1 of the polymer layer SPL may be about 65 degrees or less, and at the second temperature, a contact angle of water to the first surface F1 of the polymer layer SPL may be about 95 degrees to about 100 degrees. A surface energy of the first surface F1 of the polymer layer SPL at the first temperature may be higher than a surface energy of the first surface F1 of the polymer layer SPL at the second temperature.

The adhesive strength of the polymer layer SPL to the glass substrate GL may vary depending on the temperature. For example, the amount of work required to separate the glass substrate GL from the polymer layer SPL may vary based on temperature. A change in adhesive strength of the polymer layer SPL to the glass substrate GL according to the temperature (e.g., the temperature change or temperature difference) may be less than a change in adhesive strength of the adhesive layer PSA2 to the polymer layer SPL. For example, the magnitude of a difference between the adhesive strength of the polymer layer SPL to the glass substrate GL at the first temperature and the adhesive strength of the polymer layer SPL to the glass substrate GL at the second temperature may be less than the magnitude of a difference between the adhesive strength of the polymer layer SPL to the adhesive layer PSA2 at the first temperature and the adhesive strength of the polymer layer SPL to the adhesive layer PSA2 at the second temperature. In some embodiments, the magnitude of the rate of change in adhesive strength of the polymer layer SPL to the glass substrate GL with respect to temperature (e.g., the temperature of the polymer layer SPL) at a third temperature (or at every temperature within a temperature range, for example, the entire range) between the first temperature and the second temperature may be less than the magnitude of a rate of change in adhesive strength of the polymer layer SPL to the adhesive layer PSA2 with respect to temperature at the third temperature (or at every corresponding temperature within the temperature range). In some embodiments, the polymer layer SPL may adhere to the glass substrate GL and to the adhesive layer PSA2 at the first temperature, and the polymer layer SPL may adhere to the glass substrate GL and be separated only from the adhesive layer PSA2 at the second temperature higher than the first temperature. For example, the adhesive strength of the polymer layer SPL to the glass substrate GL at the second temperature may be greater than the adhesive strength of the polymer layer SPL to the adhesive layer PSA2 at the second temperature.

The thickness T1 of the polymer layer SPL may be about 0.01 µm to about 100 µm. When the thickness T1 of the polymer layer SPL is less than about 0.01 µm, the first surface F1 of the polymer layer SPL may not have hydrophobicity enough to be separated from the adhesive layer PSA2. When the thickness T1 of the polymer layer SPL exceeds about 100 µm, excessive stress is applied to the protective layer PL due to an increase in thickness during the folding operation of the display device DD.

The adhesive layer PSA2 may be disposed on the polymer layer SPL. The protective layer PL may be disposed on the adhesive layer PSA2. For example, the adhesive layer PSA2 may be disposed between the polymer layer SPL and the protective layer PL. The adhesive layer PSA2 may function to couple (e.g., attach) the polymer layer SPL and the protective layer PL.

The protective layer PL may be disposed on the adhesive layer PSA2. The protective layer PL may function to protect the glass substrate GL from an external impact.

The protective layer PL may include a synthetic resin film. For example, the protective layer PL may include a polyimide film, but is not limited thereto. The protective layer PL may include a plastic film as a base layer. The protective layer PL may include a plastic film including (e.g., being) at least one selected from the group consisting of polyethersulfone (PES), polyacrylate, polyetherimide (PEI), polyethylene naphthalate (PEN), polyethylene terephthalate (PET), polyphenylene sulfide (PPS), polyarylate, polyimide (PI), polycarbonate (PC), poly(arylene ethersulfone), and combinations thereof. A material constituting the protective layer PL is not to be limited to plastic resins, and may include (e.g., be) an organic/inorganic composite material. The protective layer PL may include (e.g., be) a porous organic layer and an inorganic material filled in the pores of the porous organic layer.

The window WM of an embodiment may further include a hard coating layer HC on the protective layer PL. The hard coating layer HC may include (e.g., be) at least one of suitable, generally known, and/or generally available hard coating layer materials, but is not particularly limited thereto.

Figure 4:
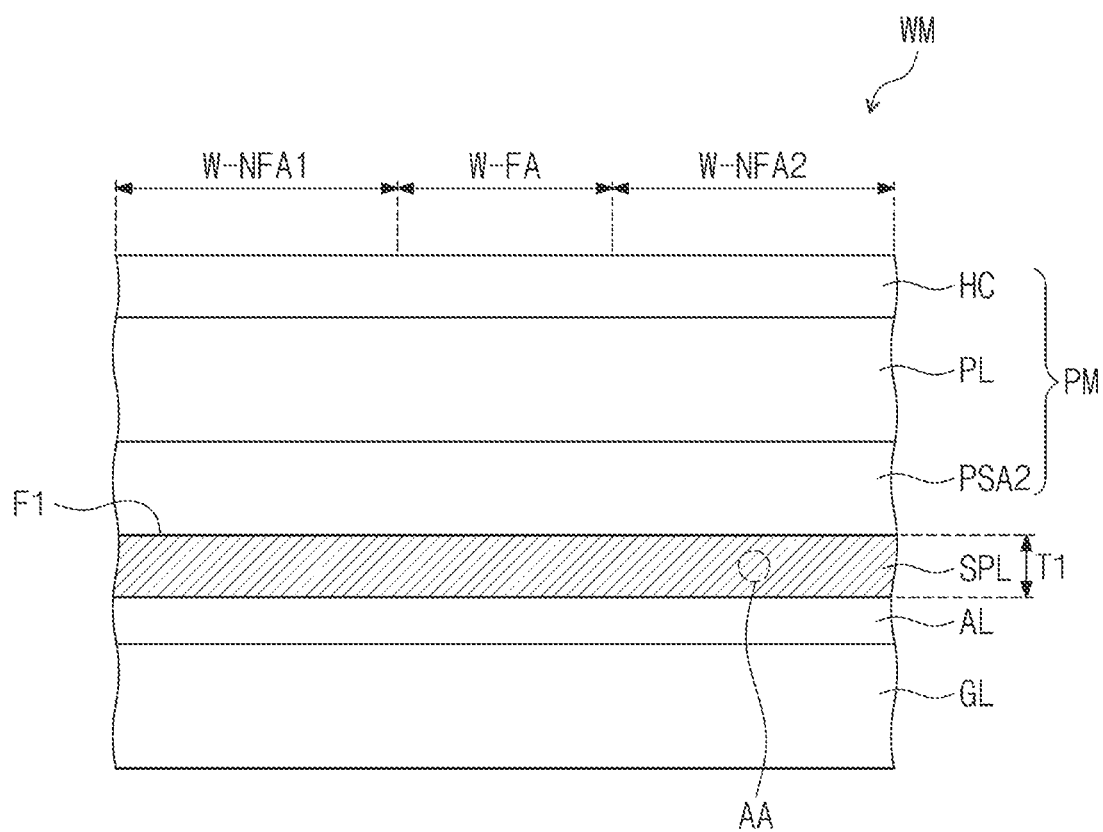
FIG. 4 is a cross-sectional view of a window according to an embodiment.
Figure 5A:
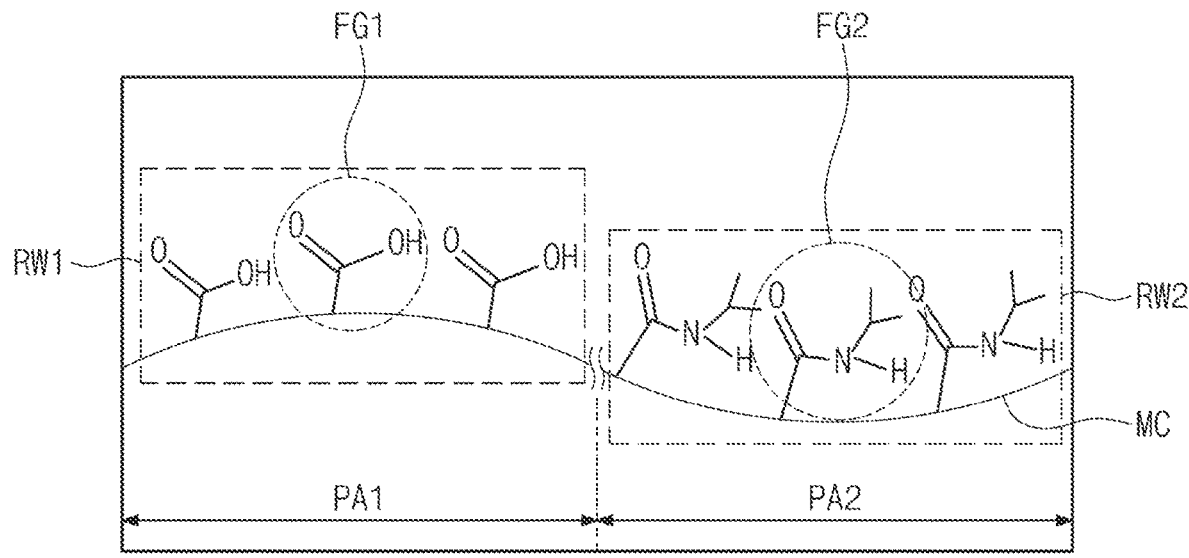
FIG. 5A is a view schematically illustrating a material included in a window according to an embodiment.
Figure 5B:
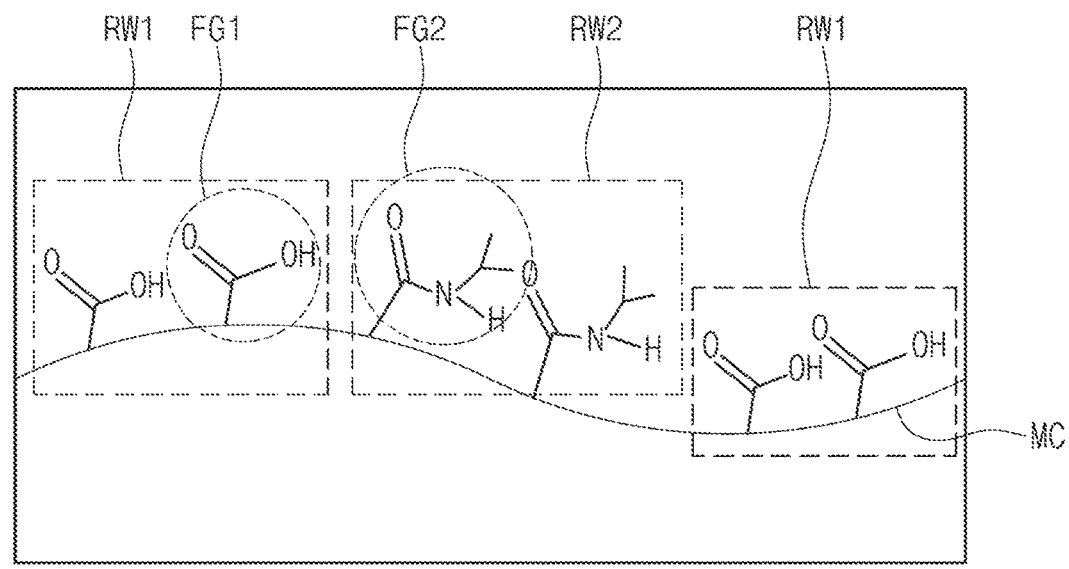
FIG. 5B is a view schematically illustrating a material included in a window according to an embodiment.
Figure 5C:
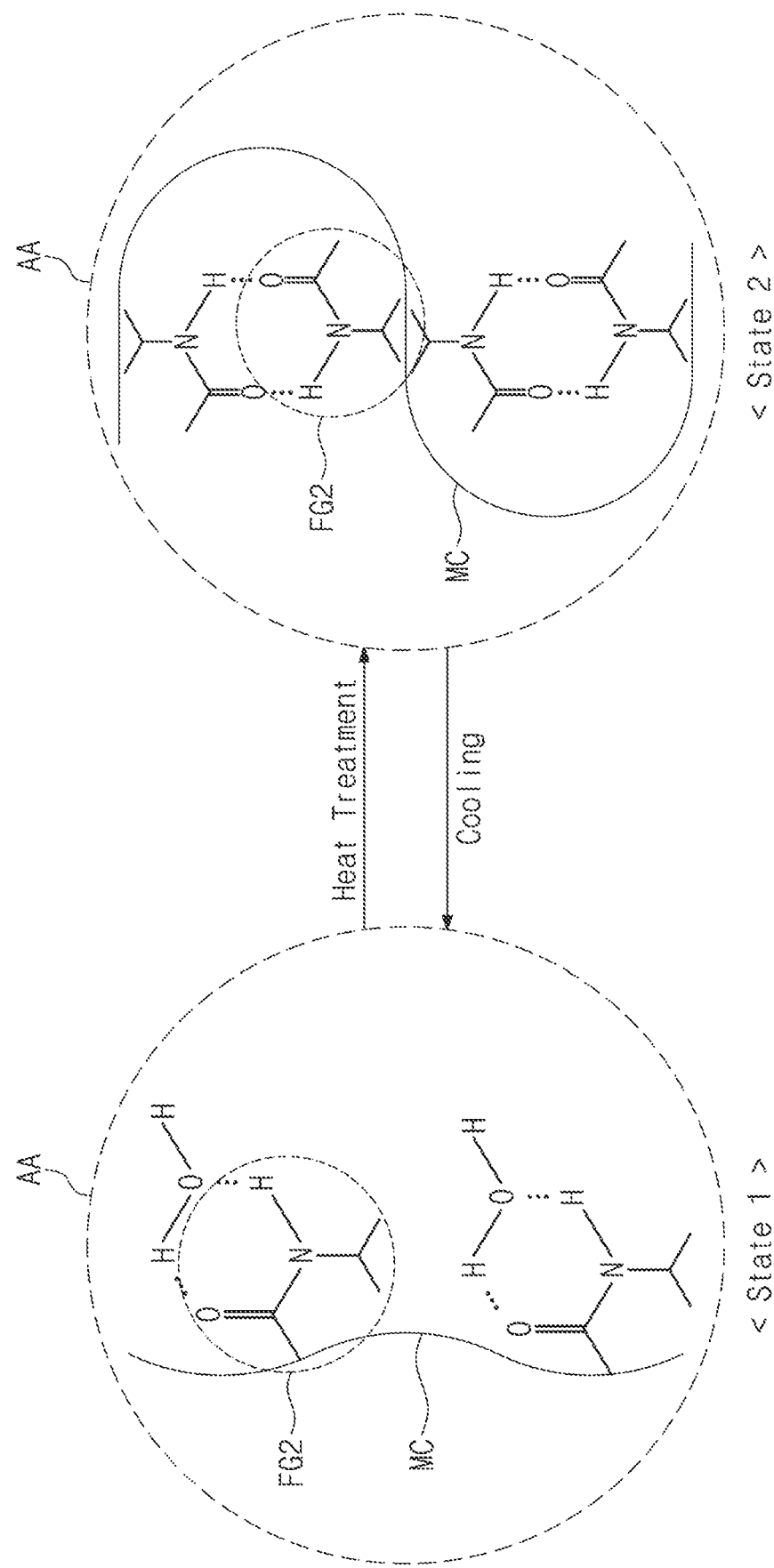
FIG. 5C is an enlarged view of a portion of a window according to an embodiment.

FIG. 4 is a cross-sectional view of a window according to an embodiment. FIG. 5A is a view schematically illustrating a material included in a window according to an embodiment. FIG. 5B is a view schematically illustrating a material included in a window according to an embodiment. FIG. 5C is an enlarged view of a portion of a window according to an embodiment. FIG. 5C is an enlarged view of portion AA illustrated in FIG. 4.

Referring FIGS. 4 to 5C, the window WM may include a folding area W-FA of the window WM, and a first non-folding area W-NFA1 and a second non-folding area W-NFA2 of the window WM which are spaced apart from each other with the folding area W-FA of the window WM disposed therebetween. The window WM may be bent with reference to the folding axis FX (FIG. 1). The folding area W-FA of the window WM may correspond to the folding area FA (FIG. 1) of the display device DD (FIG. 1), and the first non-folding area W-NFA1 and the second non-folding area W-NFA2 of the window WM may respectively correspond to the first non-folding area NFA1 (FIG. 1) and the second non-folding area NFA2 (FIG. 1) of the display device DD (FIG. 1).

In an embodiment, the polymer layer SPL may include (e.g., be) a polymer including a main chain MC, a first side chain FG1 substituted at the main chain MC, and a second side chain FG2 substituted at the main chain MC.

The first side chain FG1 may include (e.g., be) an acrylic acid group, and the second side chain FG2 may include (e.g., be) an amide group. In an embodiment, a substituted or unsubstituted isopropyl group substituted at a nitrogen atom of the amide group included in the second side chain FG2, or an alkyl group substituted at a nitrogen atom and including at least one fluorine atom, may be included. The surface of the polymer layer SPL may have higher hydrophobicity in a case in which a substituted or unsubstituted isopropyl group is substituted at the nitrogen atom of the amide group, or an alkyl group including at least one fluorine atom is substituted at the nitrogen atom, than in a case in which the nitrogen atom of the amide group is unsubstituted.

In an embodiment, the polymer included in the polymer layer SPL may include a first repeating unit RW1 including the first side chain FG1, and a second repeating unit RW2 including the second side chain FG2. As illustrated in FIG. 5A, the polymer included in the polymer layer SP may be a block copolymer divided into a first moiety PA1 including the first repeating unit RW1, and a second moiety PA2 including the second repeating unit RW2. However, this is illustrated only as an example, and the present disclosure is not limited thereto. For example, as illustrated in FIG. 5B, the polymer may be an alternating copolymer in which the first repeating unit RW1 and the second repeating unit RW2 are alternately coupled (e.g., connected) to each other, or a random copolymer in which the first repeating unit RW1 and the second repeating unit RW2 are coupled (e.g., connected) to each other, for example, randomly coupled (e.g., connected) to each other.

In an embodiment, the polymer included in the polymer layer SPL may be a poly(N-isopropylacrylamide)-block-poly(acrylic acid), or a poly(N-isopropylacrylamide-co-acrylic acid).

In an embodiment, the first side chain FG1 may be adjacent to the glass substrate GL. In an embodiment, the window WM may further include the adhesive auxiliary layer AL including (e.g., being) a silane coupling agent between the glass substrate GL and the polymer layer SPL. The first side chain FG1 may be adjacent to the adhesive auxiliary layer AL. The silane coupling agent may include, at a side thereof, a silane group adjacent to the glass substrate GL, and include, at another side thereof, a functional group adjacent to the polymer layer SPL. For example, the silane coupling agent may include (e.g., be) an amine group on the other side thereof.

Because the first side chain FG1 binds to a functional group at the other side of the silane coupling agent, a change in a molecular structure and a change in surface energy according to the temperature change may be smaller in the first side chain FG1 than in the second side chain FG2 to be described later. As a result, a change in adhesive strength between the adhesive auxiliary layer AL and the polymer layer SPL according to the temperature change may be smaller than a change in adhesive strength between the polymer layer SPL and the adhesive layer PSA2.

The second side chain FG2 may be adjacent to the adhesive layer PSA2. The second side chain FG2 may be provided in plurality. The proportion of the plurality of second side chains FG2 hydrogen-bonded to each other at the second temperature may be greater than the proportion of the plurality of the second side chains FG2 hydrogen-bonded to each other at the first temperature. As the proportion of the plurality of the second side chains FG2 hydrogen-bonded to each other is greater (e.g., increases), the first surface F1 of the polymer layer SPL adjacent to the adhesive layer PSA2 may become more hydrophobic.

A first state at the first temperature and a second state at the second temperature of the polymer included in the polymer layer SPL may be reversible. For example, in the polymer layer SPL, the first surface F1 adjacent to the adhesive layer PSA2 may be reversibly changed into hydrophilicity or hydrophobicity according to the temperature change. In the window WM of an embodiment, the one side F1 of the polymer layer SPL may be able to reversibly change into hydrophilicity or hydrophobicity, and thus, in the window WM, only the protective layer PL may be selectively replaced when the protective layer PL is damaged.

Hereinafter, a window manufacturing method will be described in more detail with reference to FIGS. 6 to 11. The characteristics of the structure described for the window of the present disclosure may not be repeated, but the characteristics of the window manufacturing method will be described in more detail.

Figure 6:
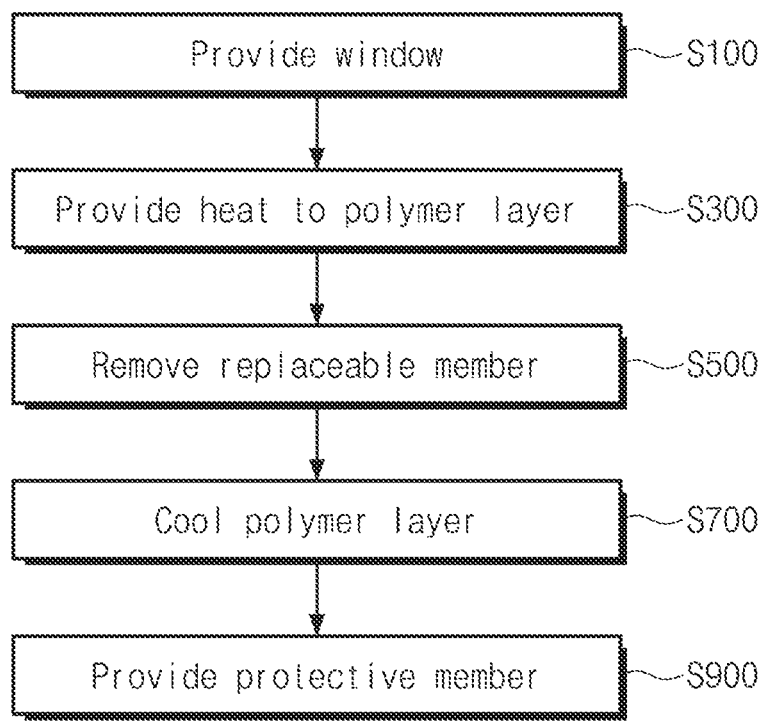
FIG. 6 is a flowchart illustrating a window manufacturing method of an embodiment.

FIG. 6 is a flowchart illustrating a window manufacturing method of an embodiment. FIGS. 7 to 11 are views schematically illustrating a process of the window manufacturing method. Hereinafter, the window manufacturing method will be described in more detail with reference to FIGS. 6 to 11.

Referring to FIG. 6, the window manufacturing method of an embodiment includes providing a window (S100), providing heat to (e.g., heating) a polymer layer (S300), removing a replaceable member (S500), cooling the polymer layer (S700), and providing a protective member (S900).

Figure 7:
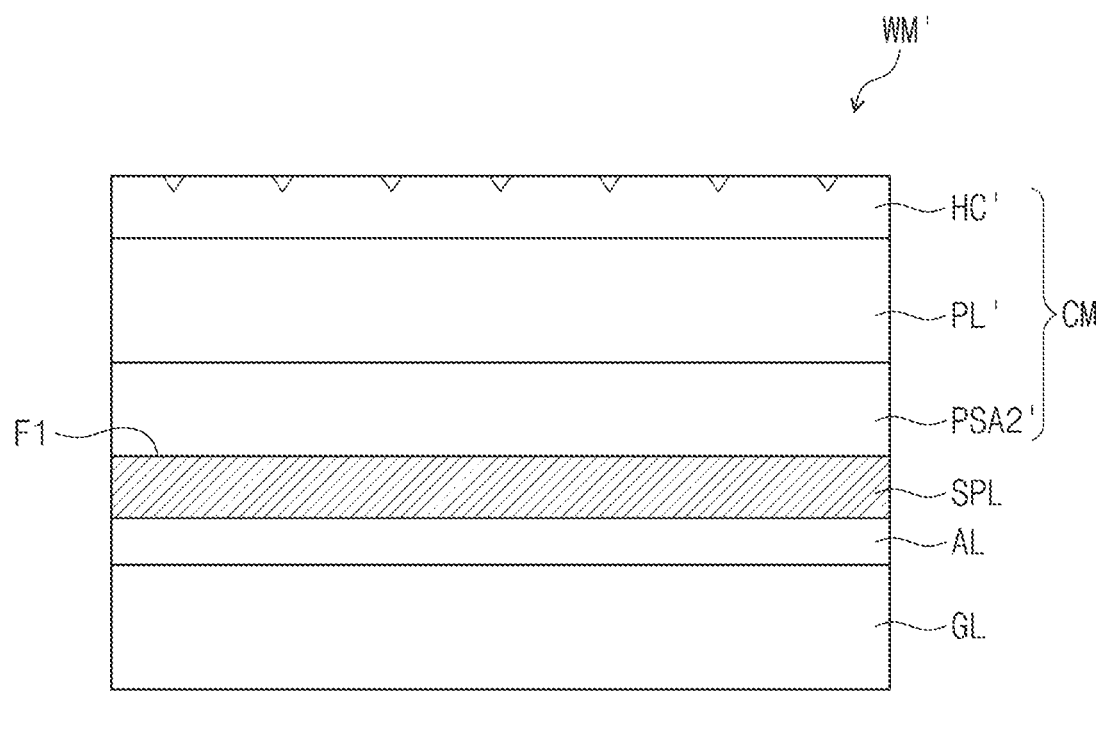
FIG. 7 is a view schematically illustrating a process of a window manufacturing method.

FIG. 7 is a view illustrating the providing of the window (S100) according to an embodiment. Referring to FIG. 7, the providing of the window (S100) according to an embodiment may include providing a window WM' including a glass substrate GL, a polymer layer SPL disposed on the glass substrate GL, and a replaceable member CM disposed on the polymer layer SPL. The replaceable member CM may include an adhesive layer PSA2' and a protective layer PL' disposed on the adhesive layer PSA2'. In an embodiment, the replaceable member CM may further include a hard coating layer HC' on the protective layer PL'. The replaceable member CM may be the protective layer PL' and/or hard coating layer HC' which has been damaged.

Figure 8:
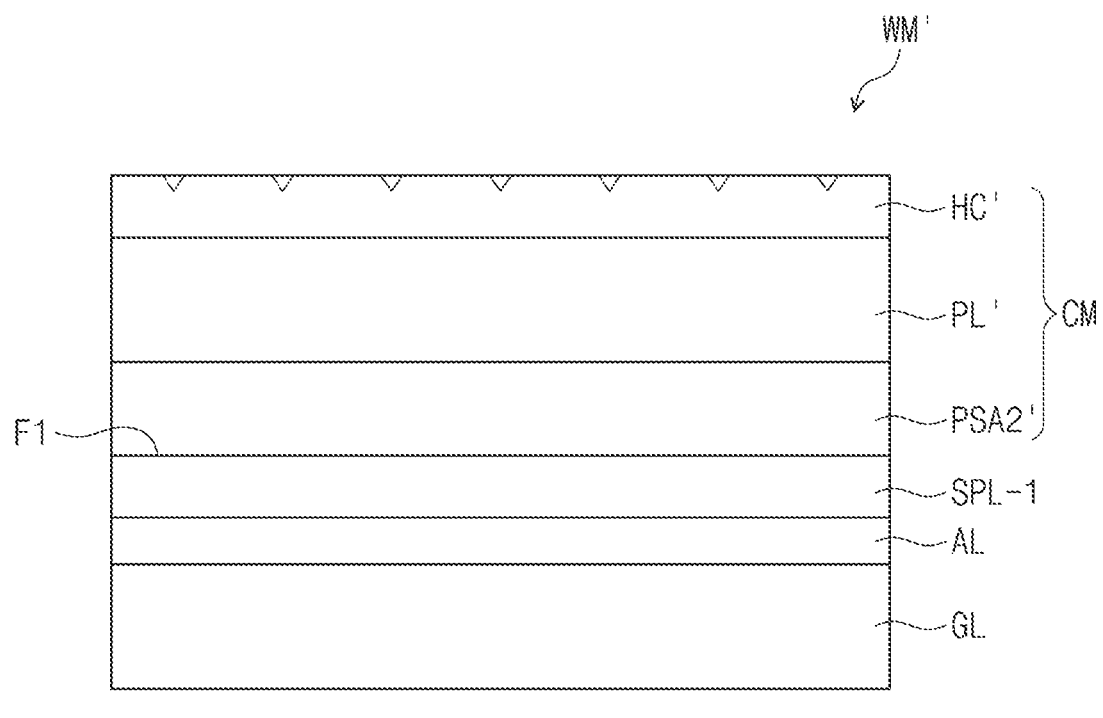
FIG. 8 is a view schematically illustrating a process of a window manufacturing method.

FIG. 8 is a view illustrating the window after providing heat to the polymer layer (S300) according to an embodiment. Referring to FIG. 8, the providing of heat to the polymer layer (S300) may include providing heat of a first temperature to the polymer layer SPL (FIG. 7). For example, heat may be provided to the polymer layer SPL (FIG. 7) so that (e.g., heat may be provided until) a temperature of the polymer layer SPL (FIG. 7) is at the first temperature. The first temperature may be about 50° C. to about 120° C. The providing of heat to the polymer layer (S300) may include changing the first surface F1 of the polymer layer SPL-1 adjacent to the adhesive layer PSA2' from being hydrophilic to being hydrophobic. A contact angle of water to the first surface F1 of the polymer layer SPL-1 which has received the heat may be about 65 degrees or less.

In an embodiment, the polymer layer may include (e.g., be) a polymer including a plurality of amide groups, and the providing of heat to the polymer layer (S300) may include increasing the proportion of a plurality of amide groups hydrogen-bonded to each other in one polymer unit included in the polymer layer. The providing of heat to the polymer layer (S300) may include reducing the adhesive strength between the polymer layer SPL-1 and the adhesive layer PSA2'.

Figure 9:
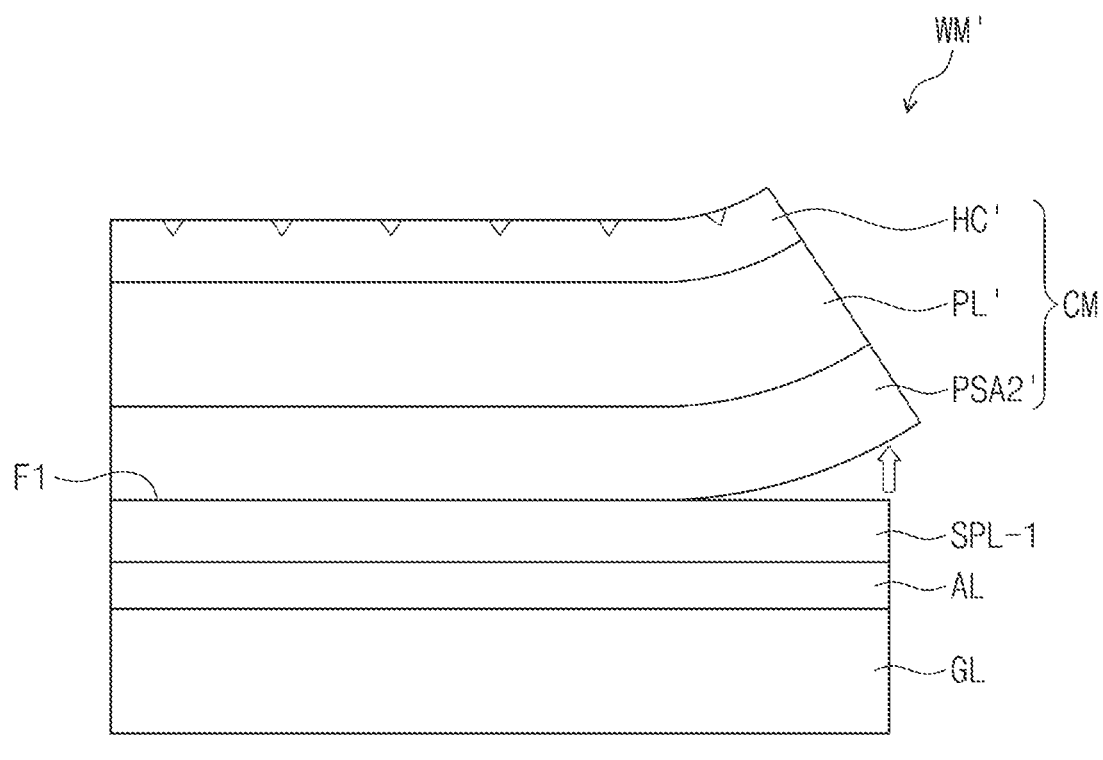
FIG. 9 is a view schematically illustrating a process of a window manufacturing method.

FIG. 9 is a view schematically illustrating the removing of the replaceable member (S500) according to an embodiment. Referring to FIG. 9, the removing of the replaceable member (S500) according to an embodiment may include removing the replaceable member CM from the polymer layer SPL-1. In the removing of the replaceable member (S500) according to an embodiment, the adhesive strength of the adhesive layer PSA2' (FIG. 8) to the polymer layer SPL-1 which has received the heat, decreases, and it is thus easy to remove the replaceable member CM (FIG. 8) from the polymer layer SPL-1.

Figure 10:
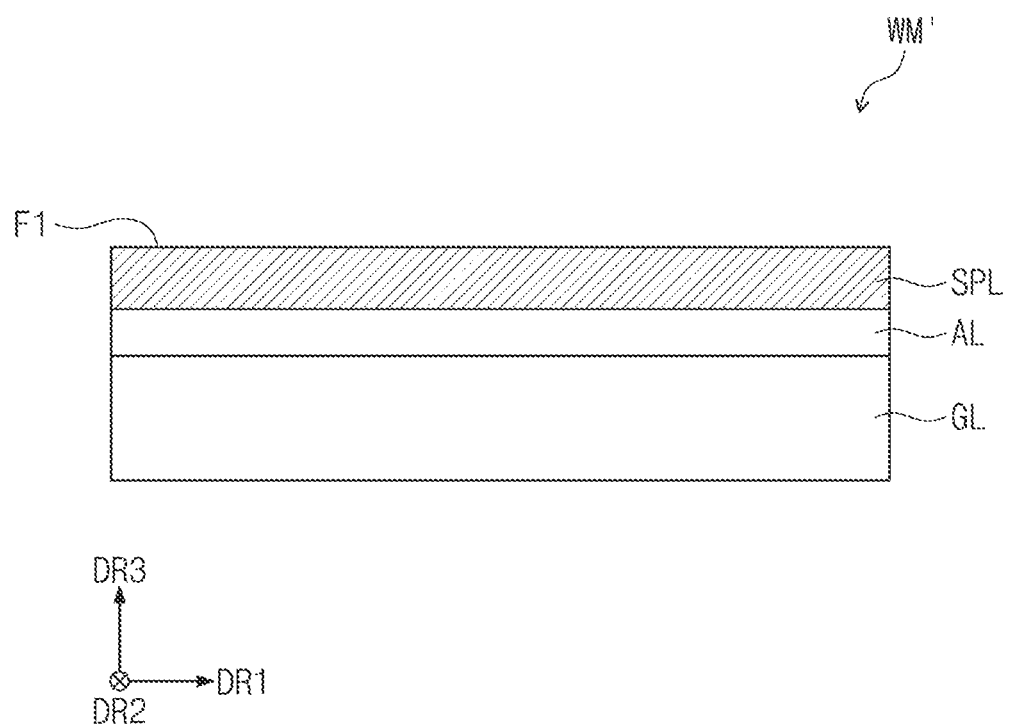
FIG. 10 is a view schematically illustrating a process of a window manufacturing method.

FIG. 10 is a view illustrating the window after cooling the polymer layer (S700) according to an embodiment. Referring to FIG. 10, the cooling of the polymer layer (S700) may include cooling the polymer layer SPL-1 (FIG. 9), from which the replaceable member CM (FIG. 9) has been removed, to the second temperature. The second temperature may be about 10° C. to about 35° C. The cooling of the polymer layer (S700) may include changing the first surface F1 of the polymer layer SPL-1 (FIG. 9) from being hydrophobic to being hydrophilic. A contact angle of water to the first surface F1 of the cooled polymer layer SPL may be about 95 degrees to about 100 degrees.

In an embodiment, the polymer layer may include (e.g., be) a polymer including a plurality of amide groups, and the cooling of the polymer layer (S700) may include reducing the proportion of the plurality of the amide groups which are hydrogen-bonded to each other and included in one polymer unit included in the polymer layer. The cooling of the polymer layer (S700) may include increasing the adhesive strength of the polymer layer SPL to the adhesive layer PSA2 (FIG. 11).

Figure 11:
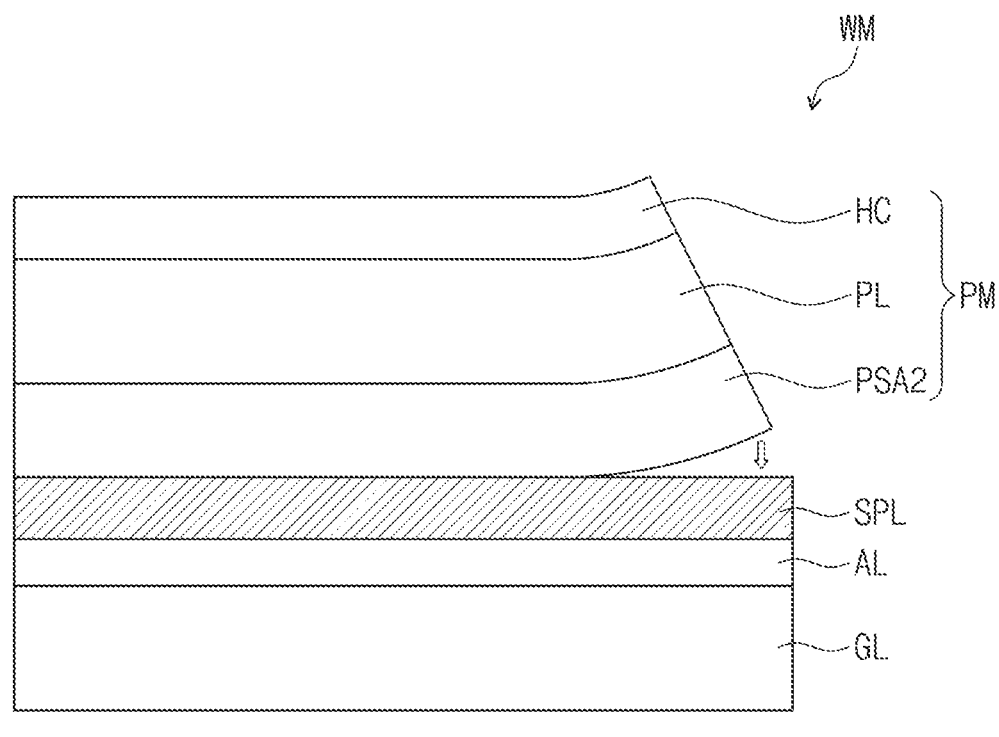
FIG. 11 is a view schematically illustrating a process of a window manufacturing method.
Figure 11:
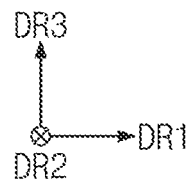

FIG. 11 is a view schematically illustrating the providing of the protective member (S900) according to an embodiment. The providing of the protective member (S900) according to an embodiment may include providing the protective member PM onto the cooled polymer layer SPL. In an embodiment, the protective member PM may include the adhesive layer PSA2 and the protective layer PL, and the providing the protective member (S900) may include disposing the adhesive layer PSA2 directly on the polymer layer SPL.

In an embodiment, because the polymer layer having different adhesive strengths to the adhesive layer at the first temperature and the second temperature is provided, a window and a display device including the same, which are capable of replacing only the protective layer, without replacing the whole window when the protective layer is damaged.

In an embodiment, a window manufacturing method may be provided which includes providing heat to the polymer layer, removing the replaceable member, cooling the polymer layer, and providing the protective member, and is thus capable of easily replacing the protective member having the damaged protective layer.

A window and a display device including the same according to an embodiment include a polymer layer having different adhesive strengths to an adhesive layer at a first temperature and a second temperature, and may thus have an effect of being capable of replacing only a protective layer without replacing a whole window when the protective layer is damaged.

A method for manufacturing a window of an embodiment includes providing heat to a polymer layer, removing a replaceable member, cooling the polymer layer, and providing a protective member, and may thus have an effect of being capable of easily replacing a protective member having a damaged protective layer.

Although the present disclosure has been described with reference to some embodiments of the present disclosure, it will be understood that the present disclosure should not be limited to or by these embodiments, but various suitable changes and modifications may be made by those skilled in the art without departing from the spirit and scope of the present disclosure.

Accordingly, the technical scope of the present disclosure is not intended to be limited to the contents set forth in the detailed description of the specification, but is intended to be defined by the appended claims and equivalents thereof.

What is claimed is:

1. A display device comprising:
a display module; and
a window on the display module,
wherein the window comprises:
a glass substrate;
a polymer layer on the glass substrate, the polymer layer comprising a polymer comprising a main chain, a plurality of acrylic acid groups substituted at the main chain, and a plurality of amide groups substituted at the main chain;
an adhesive layer on the polymer layer; and
a protective layer on the adhesive layer,
wherein a proportion of hydrogen bonds between the amide groups in the polymer at a second temperature is higher than a proportion of hydrogen bonds between the amide groups in the polymer at a first temperature, the second temperature being higher than the first temperature.

2. The display device of claim 1, wherein a surface of the polymer layer adjacent to the adhesive layer is hydrophilic at the first temperature, and
the surface of the polymer layer is hydrophobic at the second temperature.

3. The display device of claim 1, wherein the amide groups each comprise a substituted or unsubstituted isopropyl group substituted at a nitrogen atom.

4. The display device of claim 1, wherein the amide groups are each substituted at a nitrogen atom and comprise an alkyl group containing at least one fluorine atom.

5. The display device of claim 1, wherein an adhesive strength of the adhesive layer to the polymer layer at the first temperature is higher than an adhesive strength of the adhesive layer to the polymer layer at the second temperature.

6. The display device of claim 1, wherein the window comprises a folding area, a first non-folding area, and a second non-folding area, the first non-folding area and the second non-folding area being spaced apart from each other with the folding area therebetween.

\* \* \* \* \*